US006176015B1

(12) United States Patent
Morabit et al.

(10) Patent No.: US 6,176,015 B1
(45) Date of Patent: Jan. 23, 2001

(54) VEGETATION CUTTER WITH SELF-SUPPORT NON-METALLIC CUTTING ELEMENTS

(76) Inventors: Vincent D. Morabit, 1230 Wendy Rd., Rock Hill, SC (US) 29732; Michael Z. Morabito, 136 Reid St.; Christopher J. Morabito, 654 E. Main St., both of Rock Hill, SC (US) 29730

( * ) Notice: Under 35 U.S.C. 154(b), the term of this patent shall be extended for 0 days.

(21) Appl. No.: 09/076,002

(22) Filed: May 12, 1998

Related U.S. Application Data (63) Continuation-in-part of application No. 09/010,992, filed on Jan. 22, 1998, now Pat. No. 5,996,233, which is a continuation-in-part of application No. 08/656,485, filed on May 31, 1996, now Pat. No. 5,761,816.

(51) Int. Cl.$^7$ ................................................. A01D 34/412
(52) U.S. Cl. ................................. 30/276; 30/347; 56/12.7; 56/295
(58) Field of Search ....................... 30/276, 347; 56/12.7, 56/295, 255; D15/17

(56) References Cited

U.S. PATENT DOCUMENTS

| | | |
|---|---|---|
| D. 245,757 | 9/1977 | Fisher et al. . |
| D. 249,150 | 8/1978 | Scanland et al. . |
| D. 250,648 | 12/1978 | Scanland et al. . |
| 4,065,913 | 1/1978 | Fisher et al. ............................. 56/295 |
| 4,107,841 * | 8/1978 | Rebhun .................................. 30/276 |
| 4,126,990 | 11/1978 | Fisher et al. ............................. 56/295 |
| 4,126,991 | 11/1978 | Gobin et al. ............................. 56/295 |
| 4,165,597 | 8/1979 | Scanland et al. ........................ 56/295 |
| 4,300,336 * | 11/1981 | Miyata .................................... 30/276 |
| 4,356,686 | 11/1982 | Lessig, III ............................... 56/295 |
| 4,571,831 | 2/1986 | White, III ............................... 30/276 |
| 4,825,627 | 5/1989 | Truderung .............................. 56/295 |
| 5,048,278 | 9/1991 | Jones et al. ............................. 56/295 |
| 5,430,943 * | 7/1995 | Lee ......................................... 30/347 |
| 5,640,836 * | 6/1997 | Lingerfelt ............................... 56/255 |
| 5,722,172 * | 3/1998 | Walden .................................. 30/347 |
| 5,768,867 * | 6/1998 | Carlsen ................................ 56/12.7 |
| 5,890,352 * | 4/1999 | Molina ................................ 56/12.7 |

FOREIGN PATENT DOCUMENTS

| | | |
|---|---|---|
| 0011175 | 5/1980 | (EP) . |
| WO 97/19584 | 6/1997 | (WO) . |

* cited by examiner

Primary Examiner—Hwei-Siu Payer
(74) Attorney, Agent, or Firm—Nixon & Vanderhye P.C.

(57) ABSTRACT

A vegetation cutting implement includes a rotatable support head which mounts a hub having a plurality of cutter elements comprising self-supporting struts. Each strut is more than 50% non-metallic material (typically more than 90% plastic or rubber), and the hub is readily replaceable in the vegetation cutting implement merely by detaching a fastener. Typically the cutter elements are integral with the hub, although a number of radially extending openings may be provided through which individually replaceable cutter elements pass. The self-supporting struts each preferably comprise a beam-like structure with a first axis which is the strongest axis and has a highest moment of inertia and a second, weaker axis, and the head is rotated so that the first axis of the beam-like structure of each strut is positively maintained and moves in a predetermined cutting plane which is generally transverse to a portion of vegetation to be cut. Because of the self-supporting nature of the struts, and their association with the hub, they are inherently positively maintained in the appropriate position for cutting.

7 Claims, 14 Drawing Sheets

VEGETATION CUTTER WITH SELF-SUPPORT NON-METALLIC CUTTING ELEMENTS

CROSS-REFERENCE TO RELATED APPLICATIONS

This application is a continuation-in-part of application Ser. No. 09/010,992 filed Jan. 22, 1998, U.S. Pat. No. 5,996,233 which in turn is a continuation-in-part of application Ser. No. 08/656,485 filed May 31, 1996, now U.S. Pat. No. 5,761,816. The disclosures of both of these cases are incorporated by reference herein.

BACKGROUND AND SUMMARY OF THE INVENTION

In the art of vegetation cutting implements, and methods of cutting vegetation utilizing such implements, it is highly desirable to be able to easily replace or replenish the cutting elements, to provide durability and long life thereof, to provide simplicity of mechanisms and operation, and to provide effective cutting of the vegetation with a minimum of fuel consumption (that is high aerodynamic efficiency). These desirable criteria are provided according to the present invention by utilizing a plurality of self-supporting struts instead of utilizing standard strings or filaments as the actual cutting elements (such as shown in U.S. Pat. Nos. 4,571,831 and 5,048,278, for example).

The self-supporting struts according to the present invention have the same basic desirable quantities of string or filament cutting elements, that is while effectively cutting vegetation doing minimal harm to solid objects that they might encounter, and thereby enhancing safety. The struts are made of more than 50% non-metallic material, typically more than 90% plastic or rubber, as described in said co-pending application Ser. No. 09/010,992. By "self-supporting" is meant when the end of the strut closest to the central axis of the vegetation cutting implement is supported, the free end of the strut has a deflection, based upon its own weight, of only a few degrees or less, e.g. about 5° or less. The self-supporting struts according to the invention are easy to provide in a configuration and mechanism that allows the orientation of the strut to be maintained with an appropriate orientation which is particularly important when the strut has an aerodynamic configuration (such as described in the parent applications), but which can be helpful even if the strut has a conventional cross-section (e.g. circular).

According to one aspect of the present invention, a method of cutting vegetation using at least one cutter head having a plurality of self-supporting struts each comprising more than 50% non-metallic material and each having a beam-like structure with a first axis which is the strongest axis and has the highest moment of inertia, and a second, weaker, axis. The method comprises the steps of: (a) Rotating the head with self-supporting struts about an axis of rotation so that the first axis of the beam-like structure of each strut is positively maintained and moves in a predefined cutting plane. And, (b) bringing the rotating self-supporting struts into contact with vegetation so that the cutting plane is generally transverse to a portion of the vegetation to be cut, and the self-supporting struts cut the vegetation.

Typically step (a) is practiced at a speed of at least 2000 rpm, typically on the order of 5000–12000 rpm depending upon the diameter of the cutting swath, e.g. 15,000–20,000 fpm for the trip of the element, and there is also typically the further step (c) of replacing a plurality of self-supporting struts when worn, either individually, or—where the self-supporting struts are substantially integral with a central hub—by replacing the central hub. Compared to the speed of rotation of conventional string trimmers (27,000–30,000 fpm), trimming according to the invention is much more efficient so that a speed as low as 15,000–20,000 fpm for the trip is effective.

The central hub may comprise a substantially annular element, and the cutter head may comprise first and second elements which clamp together. Step (c) is then practiced by unclamping the first and second head elements, replacing the central hub and properly positioning the self-supporting struts, and clamping the replaced central hub and substantially integral self-supporting struts between the first and second head elements. The central hub may comprise the rotatable head, which attaches to a rotatable shaft, in which case step (c) is practiced by detaching the head from the shaft and reattaching the head to the shaft. The head may comprise the end of the shaft, and radial clearance space may be provided between the shaft and the central hub, in which case step (c) is practiced by inserting a plurality of retaining elements and the radial clearance between the head and central hub. The head may comprise an open bottom annular element with a plurality of substantially radially extending bores with the struts, though self-supporting, being bendable; in this case step (c) is practiced by bending and threading the struts through the bores and pulling and pushing the struts into the open bottom annular element.

The head may comprise a disc-shaped element having a plane substantially perpendicular to the axis of rotation of the head, at least one support extending from the element substantially parallel to the axis of rotation and having a plurality of strut-receiving openings therein; and wherein step (c) is practiced by pulling radially on each existing strut to be replaced to remove it from its opening, and radially inserting a new strut into the opening.

According to another aspect of the present invention a vegetation cutting implement is provided comprising the following components: A rotatable cutter support had at the end of a supporting shaft. A power source capable of rotating the rotatable head and operatively connected thereto. And, a plurality of cutter elements releasably mounted to the rotatable cutter support head; and each cutter element comprising a self-supporting strut comprising more than 50% non-metallic material. Preferably each of the struts has a beam-like structure with a first axis which is the strongest axis and has the highest moment of inertia, and a second, weaker, axis; and wherein the elements are mounted to the cutter support head so that during rotation of self-supporting struts about an axis of rotation the first axis of the beam-like structure of each strut is positively maintained and moves in a predefined cutting plane.

The head may have a generally truncated cone configuration depression, and the plurality of cutter elements may be part of a cartridge hub; in which case the cartridge hub has a surface with a generally truncated cone configuration, matching that of the depression, the surface being received within the depression. The implement may further comprise a first fastener extending generally centrally outwardly from the depression, through a substantially central opening in the hub, and a second fastener cooperating with the first fastener to hold the hub in the depression (e.g. the first fastener comprising a screw threaded fastener such as a bolt, and the second fastener comprising a nut or the like). Typically the cutter elements are integral with a central hub, although they may be mounted by a central hub having a plurality of generally radial openings through which the cutter elements pass, in which case the cutter elements are individually replaceable in the openings. Webbing may extend between the cutter elements to facilitate positioning them and to ensure the generally self-supporting nature thereof. Typically three to eight cutter elements are provided.

The invention also relates to a replaceable hub with cutter elements for a vegetation cutter. The hub comprises: A generally annular central body portion having a central bore. A plurality of self-supporting strut cutter elements extend radially outwardly from the body portion and substantially evenly spaced circumferentially around the hub. And, each of the strut cutter elements comprising more than 50% rubber or plastic, so that a cutter element will flex when it impacts a stationary solid object such as a tree or fence. The elements may be integral with the hub body portion or the hub body portion may have a plurality of radially extending openings and a distinct cutter element passing into each opening.

It is the primary object of the present invention to provide a simple yet effective and advantageous method of cutting vegetation using a rotating cutter head, and a vegetation cutting implement and replaceable hub for use therein. This and other objects of the invention will become clear from an inspection of the detailed description of the invention and from the appended claims.

DETAILED DESCRIPTION OF THE DRAWINGS

Figure 1:
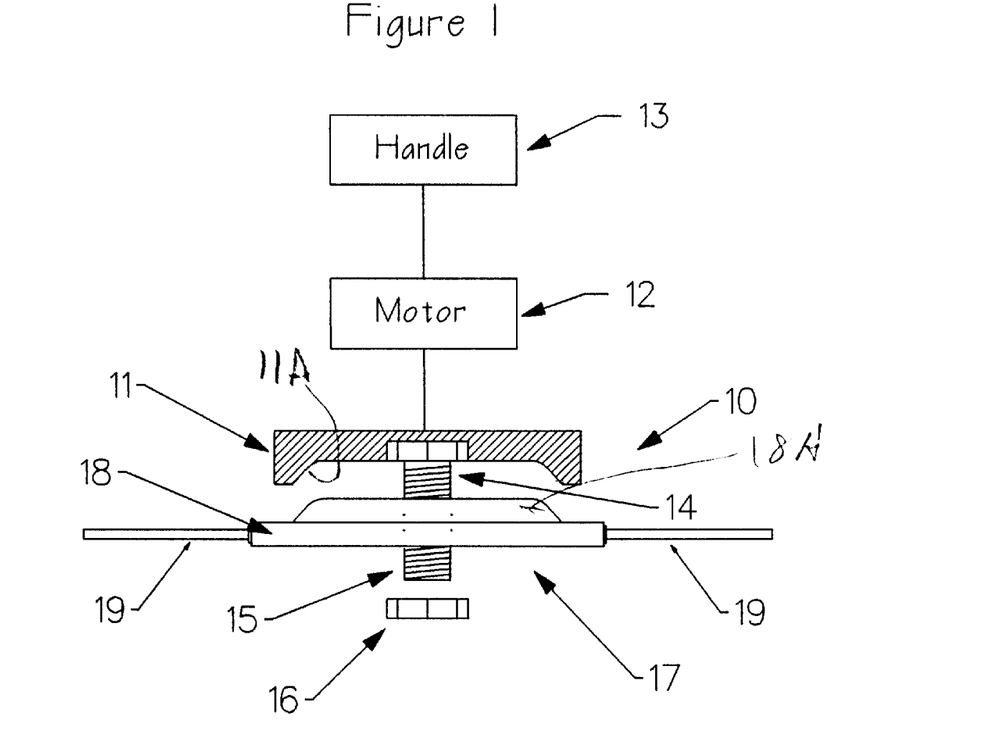
FIG. 1 is a side schematic view, partly in cross-section and partly in elevation, of an exemplary cutting implement according to the present invention.

FIG. 1 schematically illustrates a vegetation cutting implement 10 according to the invention. The implement 10 includes a rotatable cutter support head 11, a conventional motor, and a conventional handle. The motor 12 and handle 13 may be of any conventional type, such as shown in U.S. Pat. No. 4,571,831 (the disclosure of which is incorporated by reference herein), or as described in the parent applications.

In the FIG. 1 embodiment, a first fastener 14 having a head which is affixed to or integral with the implement head 11 extends downwardly therefrom being substantially centrally located, and has a threaded end 15 which cooperates with the second fastener 16, such as a conventional nut. Of course other first and second fastener elements 14, 16 may be provided of any conventional type as long as they positively hold the elements in place, and are relatively quickly releasable. For example spring clamps, cam locks, polygonal shaped rods, conventional quick release fasteners, and the like, may be provided.

The implement 10 further comprises a cartridge hub 17 which is mounted in association with the head 11. The hub 17 comprises a body portion 18, a plurality of self-supporting strut cutter elements 19 comprising more than 50% non-metallic material (typically more than 90% plastic or rubber, typically the materials as described in the parent applications), and a central opening 20 (see FIG. 2) for receipt of the fastener 14 which passes therethrough.

Figure 2:
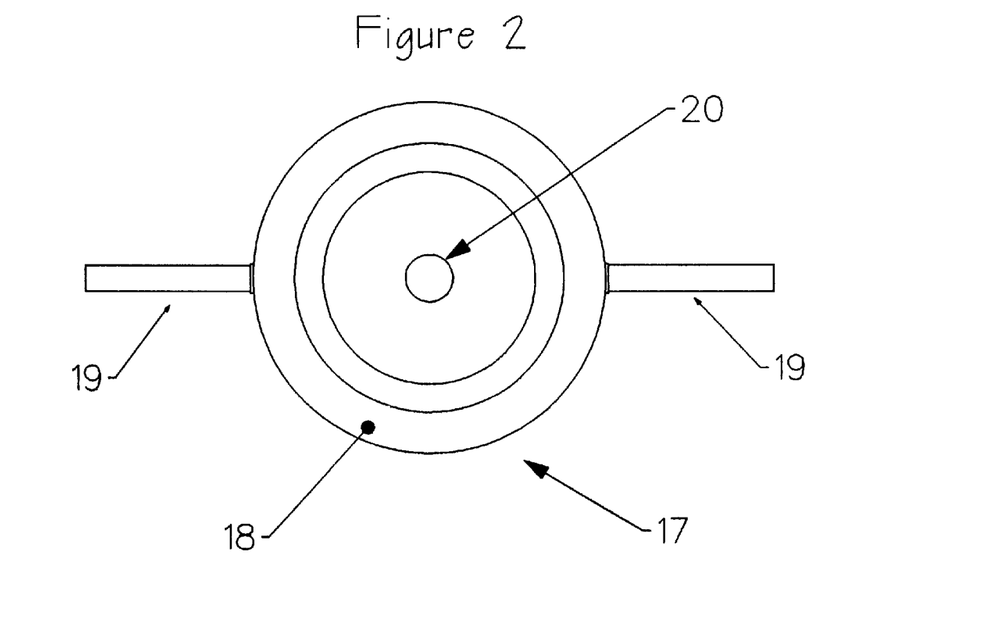
FIG. 2 is a top plan view of the hub with cutter elements of the implement of FIG. 1.

While any type of cooperating surface components may be provided to facilitate holding the hub 17 to the head 11, in the embodiment illustrated in FIGS. 1 and 2 (with similar components being illustrated in FIGS. 3 through 8), the head 11 may have a generally truncated cone configuration depression 11A which receives a complimentary shaped generally truncated cone configuration surface 18A upstanding from the body 18 of the hub 17. This distributes the holding force so that it is not entirely concentrated at the fastener 14 and opening 20. Various other shapes that may be provided for this purpose include any type of key shape that is conventional, polygons, or out of round configurations.

Figure 3:
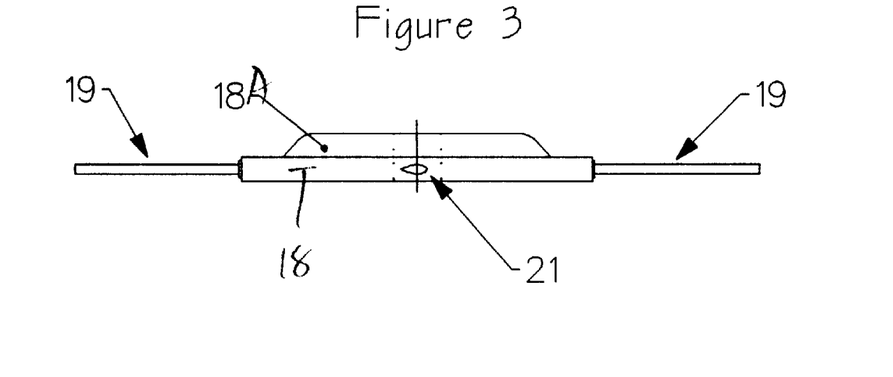
FIGS. 3 and 4 are side and top plan views, respectively, of an alternative hub that may be used with the implement of FIG. 1.
Figure 4:
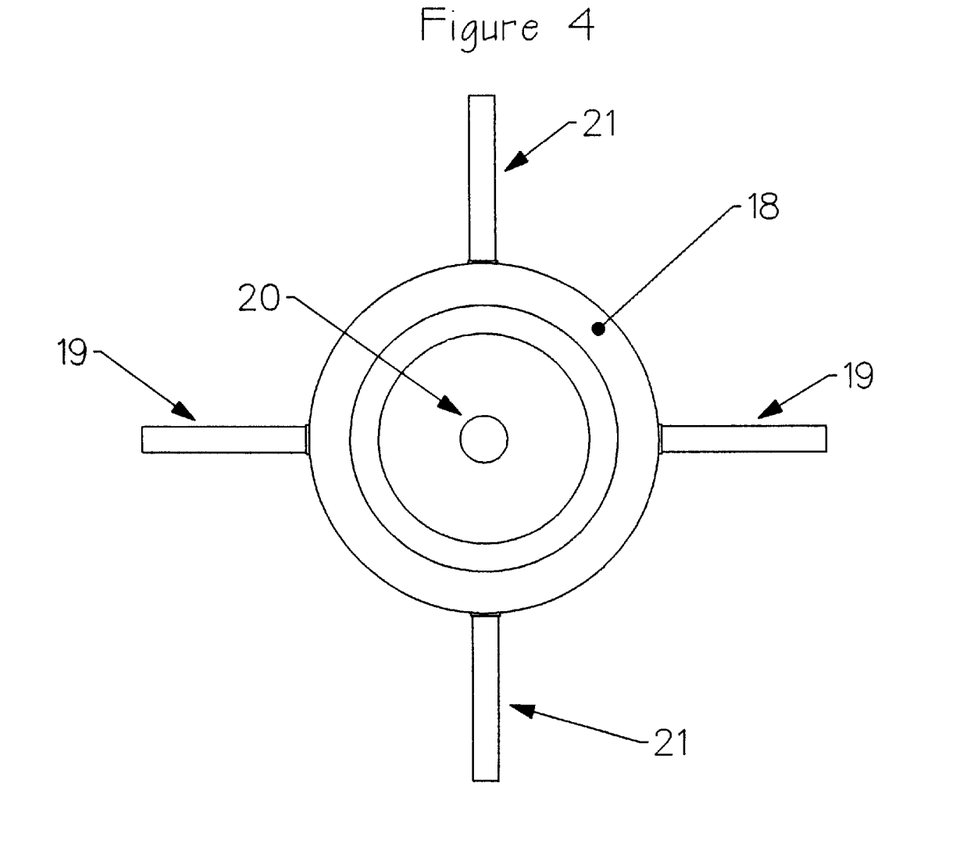

FIGS. 3 and 4 show a construction substantially identical to that in FIGS. 1 and 2 (and therefore the same reference numerals are used for the same components), except that instead of two cutter implements 19 being provided, four are provided, the cutting elements 21 also being provided. The elements 19, 21 are substantially uniformly placed around the circumstance of the body 18, e.g. about every 90° in the FIGS. 3 and 4 embodiment. Also, as seen in this embodiment, the struts 21 (and also the struts 19) preferably have a beam-like structure with a first axis which is the strongest and has the highest moment of inertia, and a second, weaker axis, the body portion 18 inherently mounting the struts 19, 21 so that the first axis thereof is positively maintained and moves in a predefined cutting plane about the axis of rotation of the head 11. The axis of rotation is along the fastener 14 in this embodiment.

Figure 5:
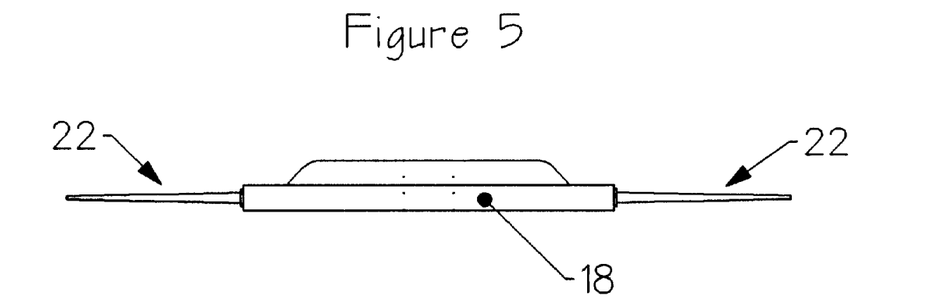
FIGS. 5 and 7 are side views.
Figure 6:
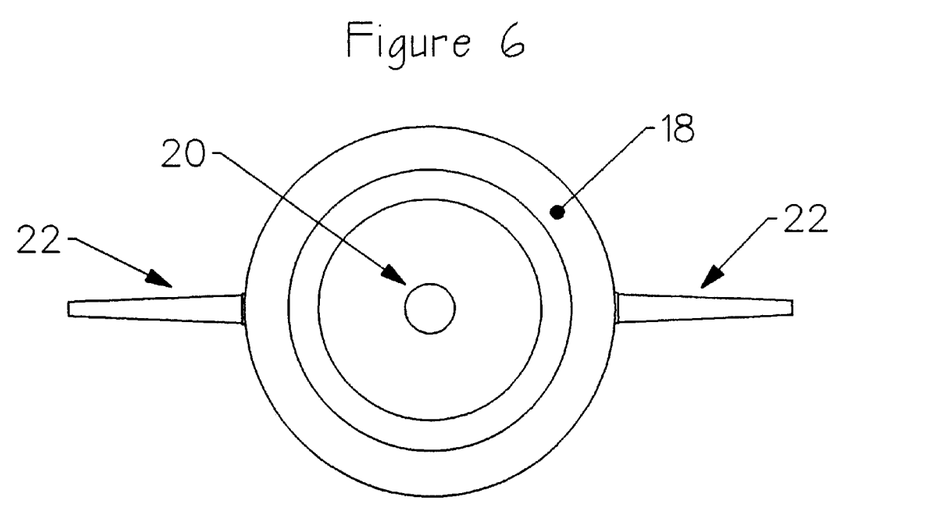
FIGS. 6 and 8 top plan views, of two alternative hubs that may be used in the cutting implement of FIG. 1.
Figure 7:
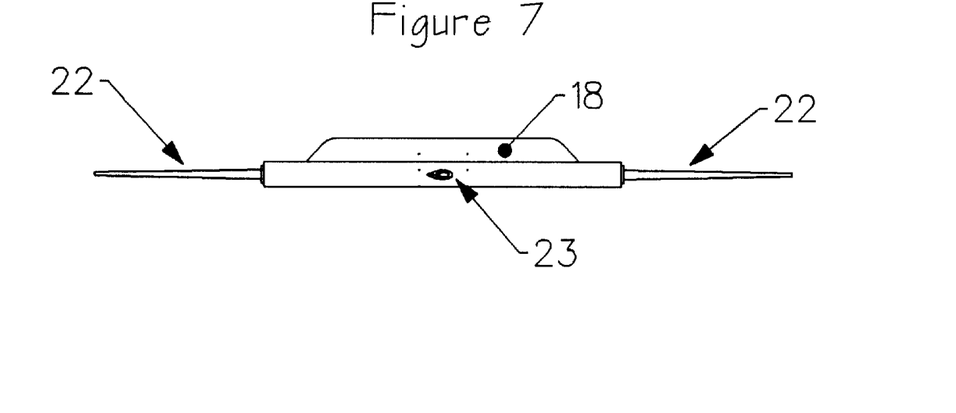
Figure 8:
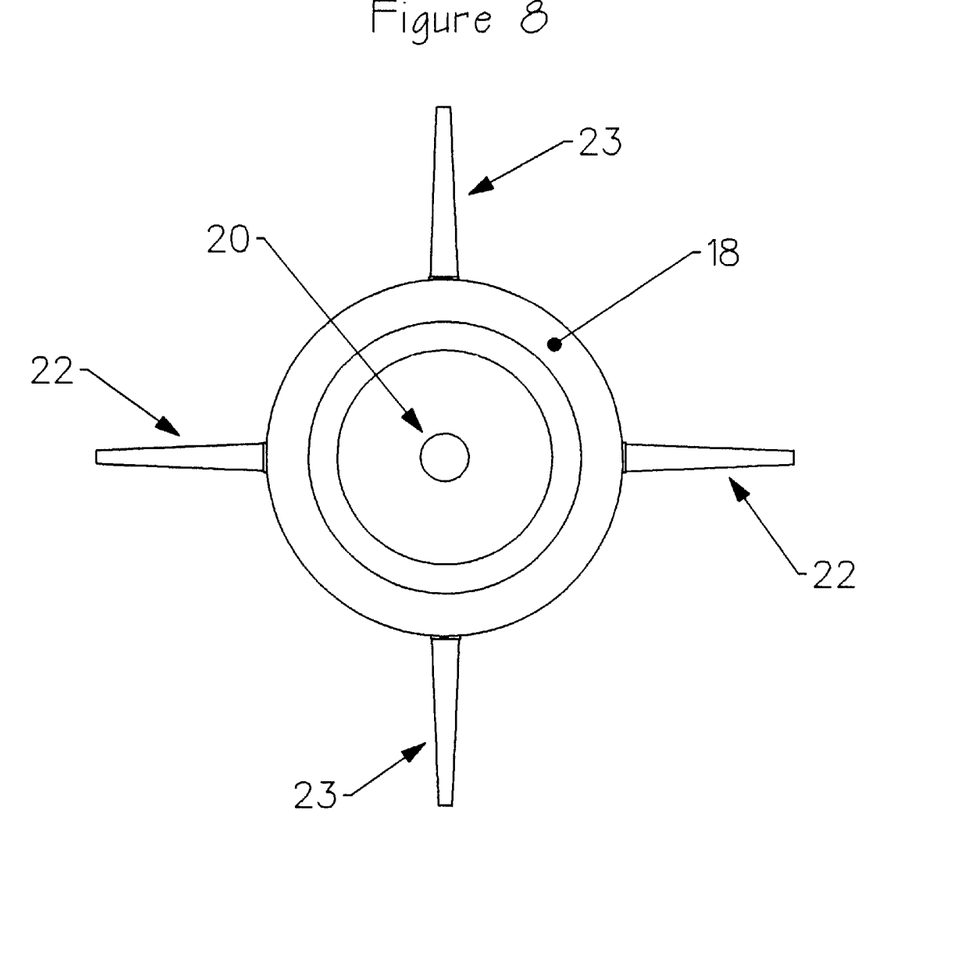

The FIGS. 5 and 6 embodiment is the same as the FIGS. 1 and 2 embodiment except that the cutter elements 22 are tapered, both when viewed from the side (FIG. 5) and the top (FIG. 6). The FIGS. 7 and 8 embodiment is the same as the FIGS. 5 and 6 embodiment except that instead of two cutter elements 22 being provided, four are provided, the elements 23 also being provided. Again, the cutter elements 22, 23 preferably have an aerodynamic configuration, such as described in the parent applications and such as described with respect to FIGS. 9 through 16.

Figure 9:
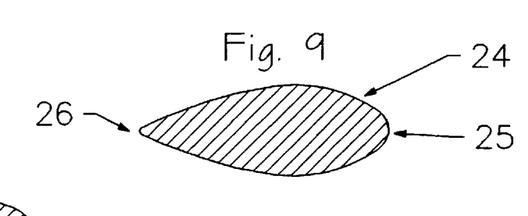
FIGS. 9 through 16 are cross-sectional views illustrating some exemplary configurations the actual cutter elements themselves of the FIGS. 1 through 8 structures might have.
Figure 10:
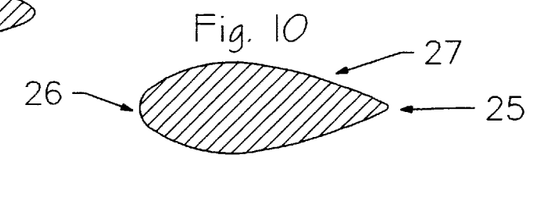
Figure 11:
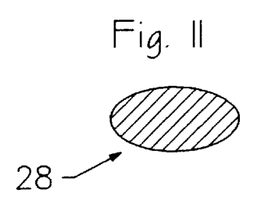
Figure 12:
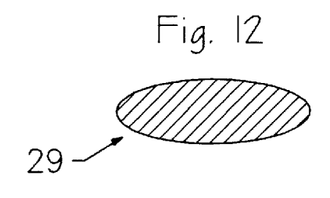
Figure 13:
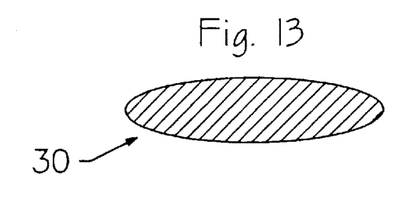
Figure 14:
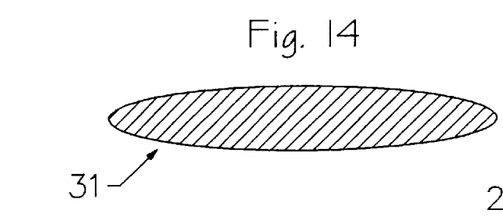
Figure 15:
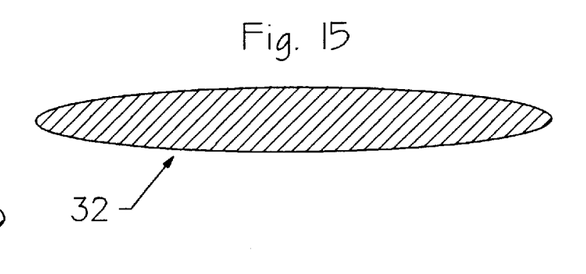
Figure 16:
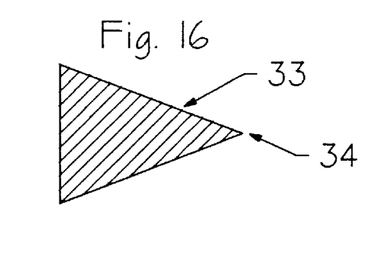

FIGS. 9 through 16 show some of the more common aerodynamic configurations that the struts 19, 21, 22, and 23 of the FIGS. 1 through 8 embodiments (or the struts in the ensuing illustrated and described embodiments) might have. For example FIG. 9 shows a substantially tear-drop shaped strut 24 with a more rounded leading edge 25 and a pointed trailing edge 26, while FIG. 10 shows a generally tear-drop shaped strut 27 where the leading edge 25 is more pointed and the trailing edge 26 more rounded. FIG. 11 shows a strut 28 with a substantially 2:1 ratio ellipse. The struts 29, 30, 31, and 32 of FIGS. 12 through 15 are also ellipses with approximate ratios of 3:1, 4:1, 6:1, and 8:1, respectively. FIG. 16 shows a triangular cross-section strut 33 with a leading edge 34. Other aerodynamic configurations, such as described in the parent applications, may also be utilized.

Figure 17:
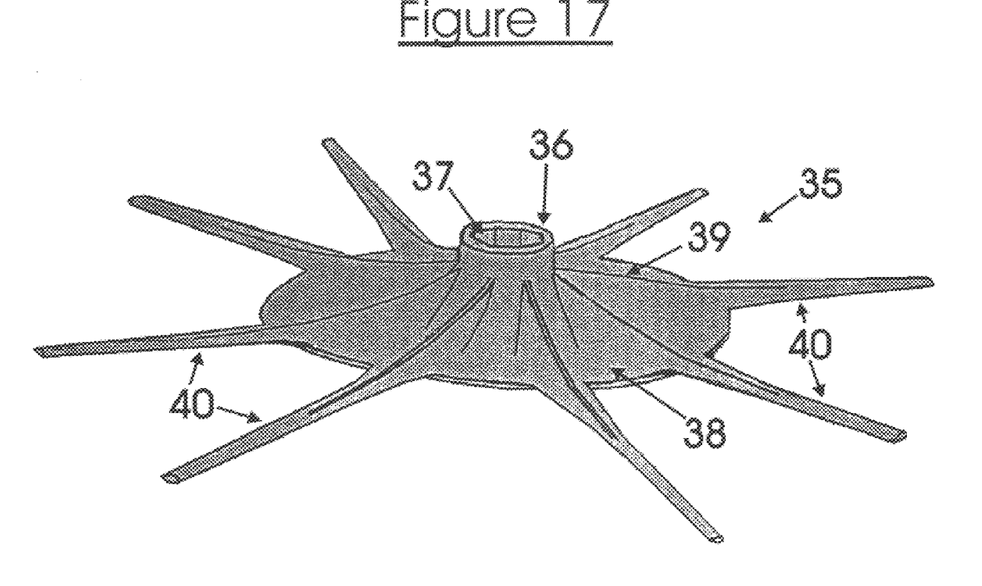
FIGS. 17 and 18 are top perspective views of two other embodiments of hubs, with cuffing elements, according to the present invention.

FIG. 17 illustrates a hub 35 according to the invention which includes a central tubular element 36 with an interior opening 37 which is adapted to receive the rotatable shaft of the motor 12. The central disc-shaped element 38 is provided which has reinforcing elements 39, which extend between the aerodynamic cutter elements 40 and assist in assuring the self-supporting nature thereof. In the FIG. 17 embodiment all of the components 36 and 38 through 40 are integral, typically being molded from an integral piece of plastic or rubber.

Figure 18:
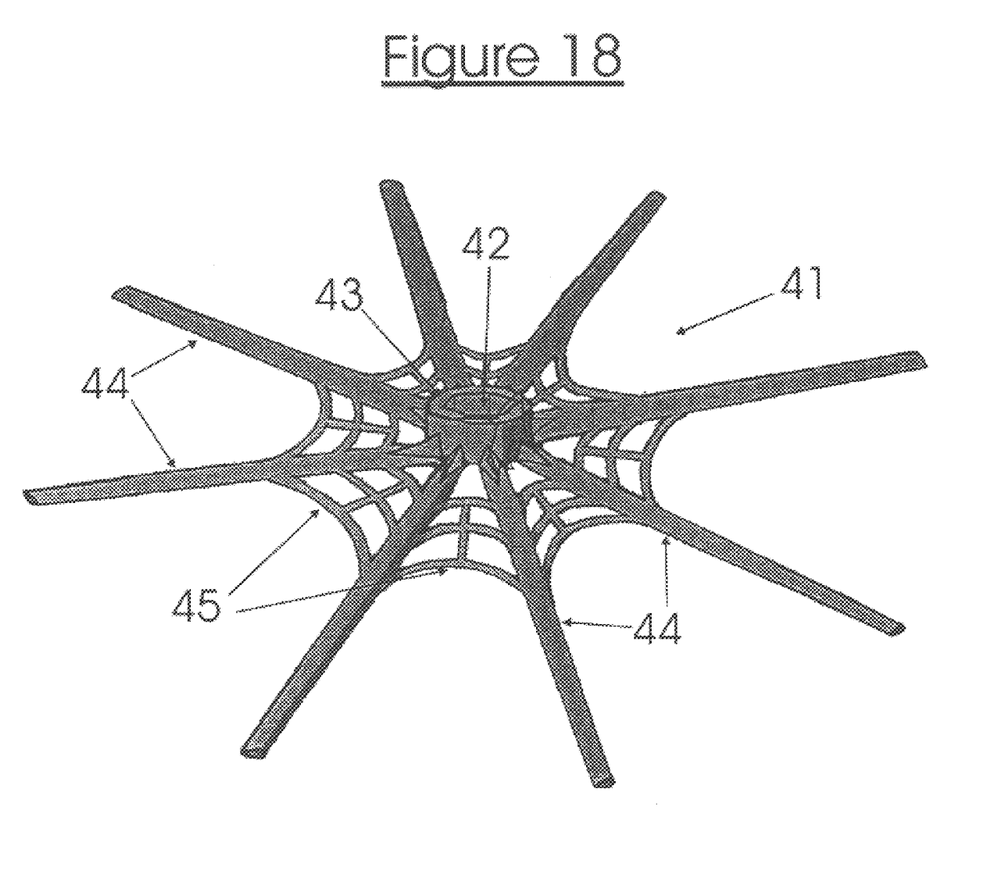

The FIG. 18 embodiment shows a central hub 41 having a central tube 43 with an interior opening 42, again for receipt of the shaft associated with the motor 12. In this case the cutting elements 44 are connected together by a webbing 45, which facilitates the self-supporting nature thereof. In this embodiment also the components 43 through 45 preferably are formed integrally with a single piece of plastic or rubber.

Figure 19:
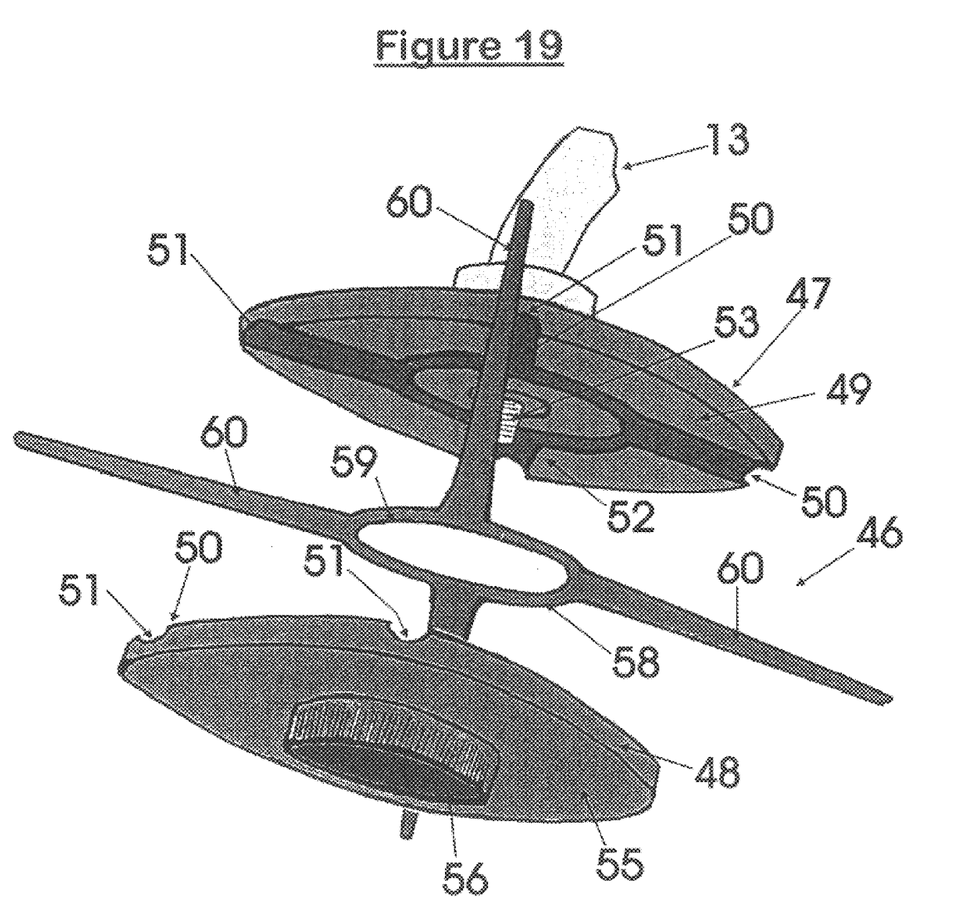
FIG. 19 is an exploded perspective view showing another form of hub with cutter elements according to the present invention, in association with cutter head fastening components.

FIG. 19 shows another embodiment of the head that may be provided according to the invention, as well as a hub with cutter elements. FIG. 19 central hub 46 is adapted to cooperate with first and second elements 47, 48 of a rotatable head, which clamp the hub 46 between them. The underside 49 of the head element 47 has a plurality of grooves 50 formed therein, which terminate in scallops 51 at the periphery of the head element 47. Disposed at a central section 52 of the head element 47 is a fastener 53, in this embodiment shown as a screw threaded fastener. The lower head element 48 has similar grooves 50 ending in scallops 51, and has a bottom surface 55 with which a knob 56 forming part of a nut which receives the fastener 53 is provided.

The hub 46 comprises an annular portion 58 including a central ring 59 from which the self-supporting strut cutter elements 60 extend radially. The grooves 50 are designed to receive the central ring 59 and the cutter elements 60 so that when the head elements 48, 47 are moved into place and the nut element 56 is grasped and rotated, the fastener 53 is screwed into place. This then clamps the hub 46 between the elements 47, 48.

Figure 20:
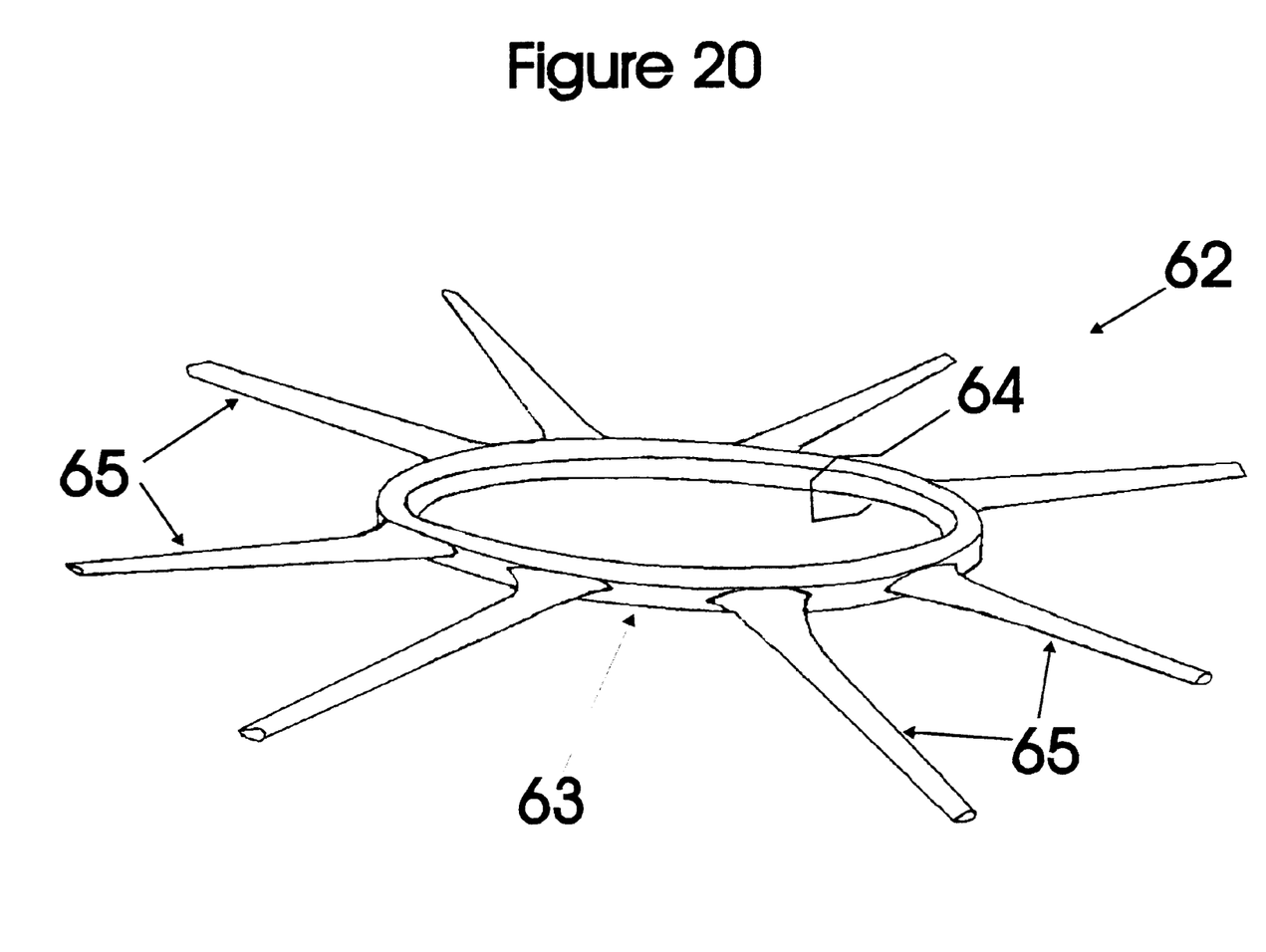
FIG. 20 is a top perspective view of another configuration of cutter implement hub according to the invention.
Figure 21:
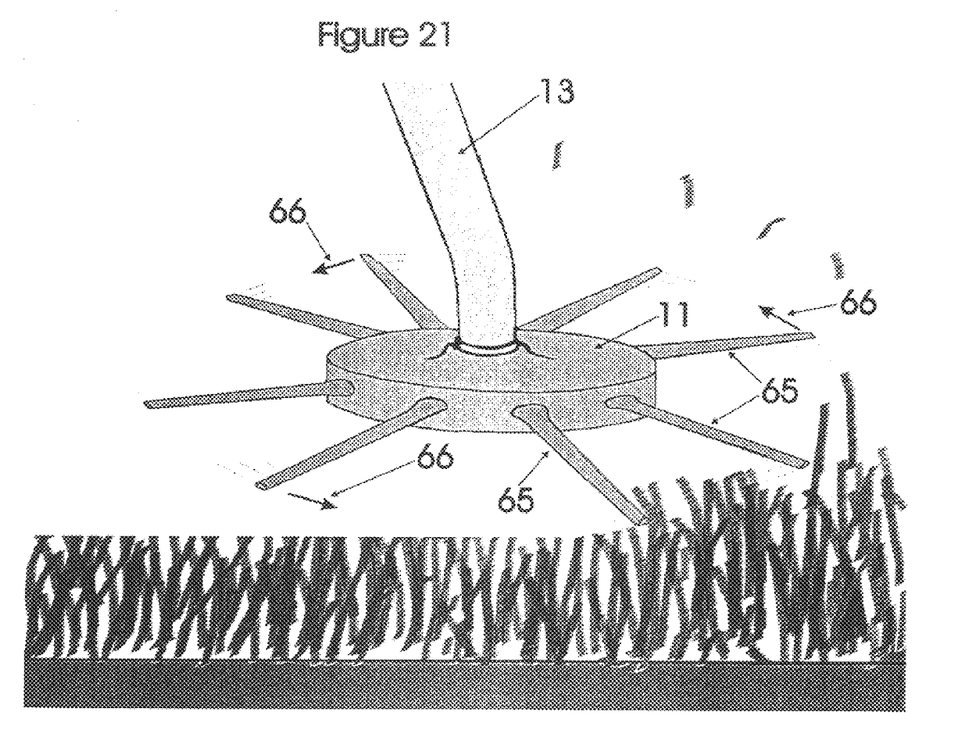
FIG. 21 is a perspective schematic view showing the utilization of a cutting implement according to the present invention in the cutting of grass.

FIG. 20 illustrates a central hub 62 having a central ring 63 with an interior ring 64, and with self-supporting struts which form the cutter element 65 extending radially outwardly therefrom. The hub 62 is shown, schematically, in FIG. 21 in association with a head 11, which also shows the self-supporting strut 65 being rotated in a direction 66. The head 11 in FIG. 21 is rotating with the self-supporting strut 65 about an axis of rotation so that the first axis of the beam-like structure of each strut 65 is positively maintained and moves in a predefined cutting plane, as is readily apparent by the movement lines of FIG. 21. In the practice of the method of the invention one brings the rotating self-supporting strut 65 into contact with the vegetation (the grass schematically illustrated in FIG. 21) so that the cutting plane of the element 65 is generally transverse to a portion of the vegetation to be cut, the self-supporting strut 65 then cutting the vegetation as schematically illustrated in FIG. 21. Typically the head 11 is rotated at a speed of at least 2,000 rpm, more typically between about 5,000–12,000 rpm typically a tip speed of about 15,000–20,000 fpm.

Figure 22:
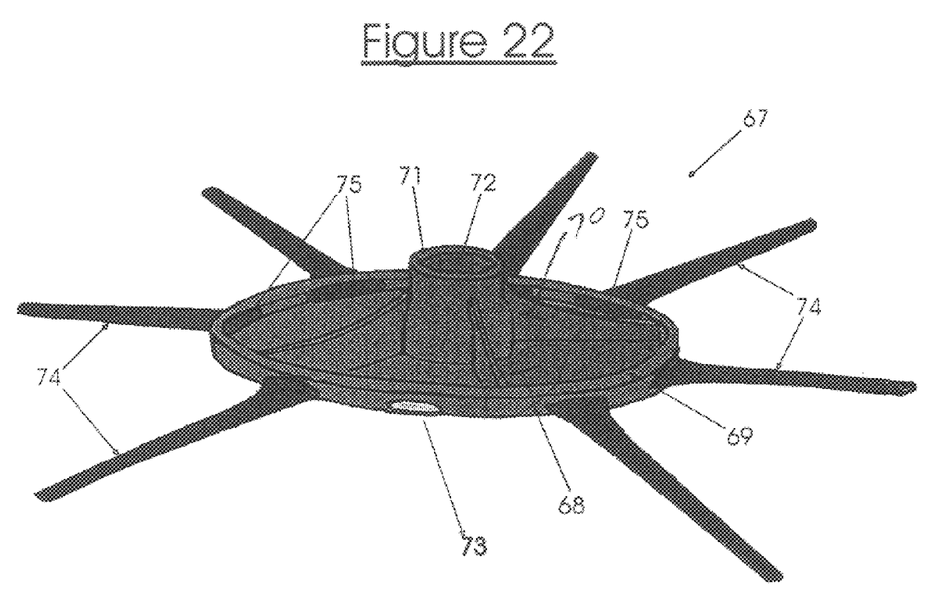
FIG. 22 is a top perspective view of another exemplary embodiment of a cutter hub according to the invention.

In the FIG. 22 embodiment, the central hub 67 has a disc-shaped main body 68 with an upstanding circumferential rim 69 and preferably with a plurality of radial supporting ribs 70 extending from a central tube 71 to the rim 69. The central tube 71 is adapted to receive the shaft of the motor 12 in the central opening 72 thereof. Provided in the rim 69 are a plurality of generally radially directed openings 73 which are adapted to receive the self-supporting strut cutter element 74. The element 74 have an enlarged end 75 thereof which engages the interior surface of the rim 69 so that the element 74 may not be detached from the body 68 as a result of the high speed rotation thereof. In this embodiment, as in others, the hub 67 may actually be the cutting head itself.

In the FIG. 22 embodiment, the elements 74 are single length (although they may be made in a variety of different lengths) pieces, and are individually replaceable as they are worn; or they all may be replaced at the same time without having to replace the disc 68 and associated components. The elements 74 are replaced merely by pushing them inwardly through the openings 73 until the enlarged end 75 of each is separate from the rim 69, and then grasping on the enlarged portion 75 by hand, or with a tool (such as a pliers or vice grips), and pulling the element 74 out of the opening 73. Although the elements 74 are self-supporting, they are flexible or bendable enough so that they will readily deform to allow such extraction, and insertion of new elements 74 in the opposite manner.

Figures 23, 24:
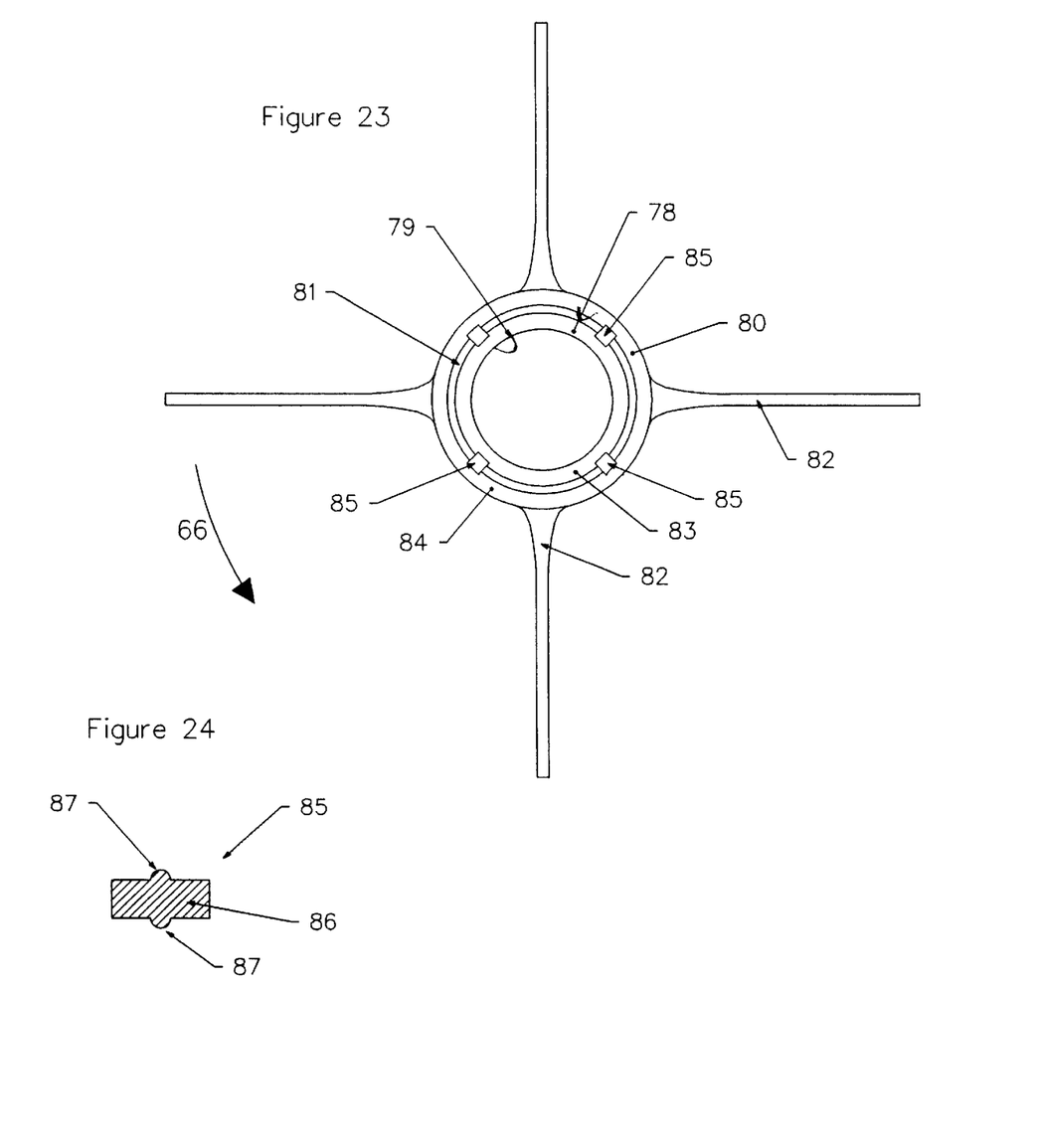
FIG. 23 is a bottom plan view of another configuration of cutting implement hub according to the invention.
FIG. 24 is a cross-sectional view of one of the retaining elements utilized with the embodiment of FIG. 23.

FIG. 23 illustrates another central hub according to the invention this time the head being illustrated generally by reference numeral 78, and having an interior bore 79 which receives a handle 13 or the shaft of the motor 12. A clamp arrangement is also provided for this embodiment.

The hub 80 central portion surrounds the head or shaft 78, with an annular clearance (space) (81) therebetween. The plurality of self-supporting strut cutter elements 82 extend radially outwardly from the central portion 80 of the hub. The bottom surface 83 of the shaft or head 78, and the bottom surface 84 of the hub 80 are substantially even with each other. A plurality of locating elements 85 are provided in the clearance space 81 which orient and locate the elements 78, 80. An exemplary locating element 85 is illustrated in FIG. 24, comprising a main body 86 with dimples 87 extending outwardly therefrom. The locating elements 85 are typically made or molded of the same material as their cooperating components, and a clamshell arrangement or the like may be provided to clamp the elements together.

Figure 25:
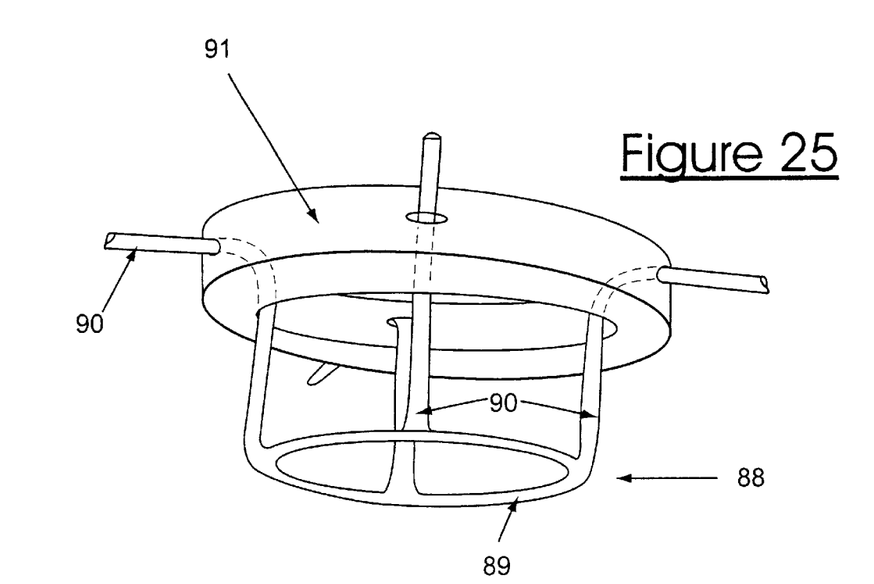
FIG. 25 is a bottom schematic perspective view showing another configuration of cutter implement hub according to the present invention, with the actual cutter elements being inserted into openings in a head.
Figure 26:
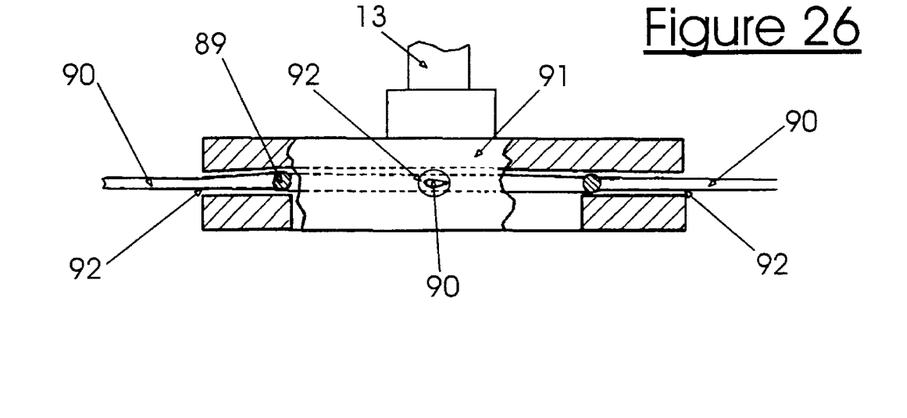
FIG. 26 is a side view, partly in cross-section and partly in elevation, of the embodiment of FIG. 25 with the head shown attached to the handle.

FIGS. 25 and 26 illustrate another embodiment in which the central hub 88 is brought into association with, and cooperates with, the head in a different manner than in the other figures. In the FIGS. 25 and 26 embodiment, the hub 88 has a central ring 89 from which the self-supporting struts 90 radially extend. The struts 90 are, though self-supporting, readily bendable, so that the free ends thereof may be placed into openings 92 in the head 91 and then by pushing and/or pulling the hub 88 may be moved from the position illustrated in FIG. 5 to that illustrated in FIG. 6. Thus by bending and threading the struts 90 through the bores 92, and pulling and pushing the struts 90, and the ring 89, into the open bottom of the substantially annular head 91, the hub 88 may be moved into and out of position, and readily replaced.

Figure 27:
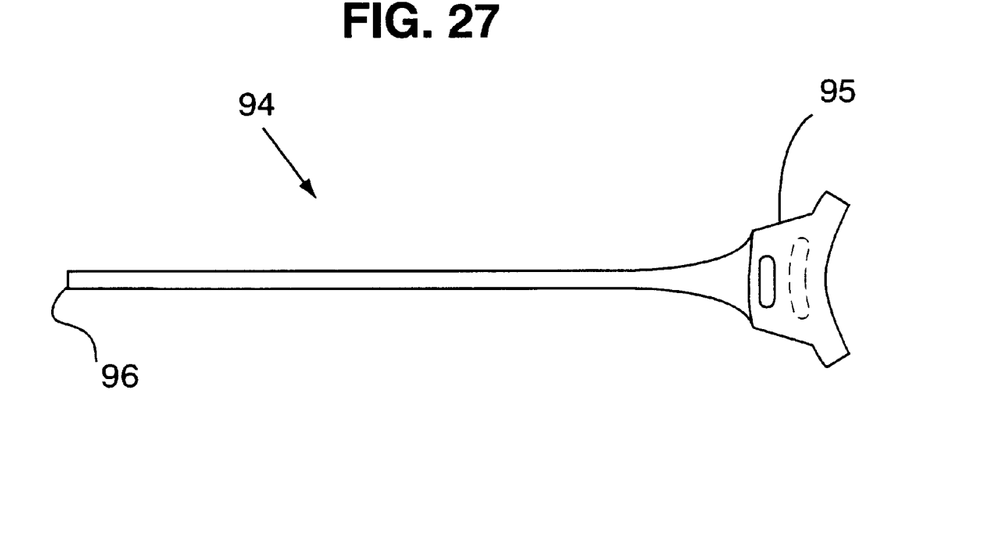
FIG. 27 is a top plan view of a cutter element per se which may be utilized in the cutter implement according to the invention, typically in the FIG. 22 embodiment.

FIG. 27 is a top plan view of one of the individual self-supporting struts 94 that may be used, for example, in other embodiments, particularly the FIG. 22 embodiment. The strut 94 includes an enlarged end 95 opposite the free end 96 thereof, the end 95 being connected to the central hub while the free end 96 rotates to effect vegetation cutting.

If desired, the self-supporting struts may be formed with a twist to provide a living hinge arrangement, and may extend through elongated holes, particularly for the FIG. 22 embodiment. A living hinge construction is described in co-pending provisional application Serial No. 60/074,899 filed Feb. 17, 1998

The vegetation cutting implement, and replaceable hub, according to the present invention, particularly when used in the method of the present invention, provide a system that is easy to replace, has a lower cost than conventional systems, readily employs multiple lines with a reduction of stress in each line, has significant durability and long life is specially and inherently balanced, has significantly reduced noise levels, lower HP requirements per strut, and has reduced wear due to greater absorption area. Quick release clamping mechanisms of conventional construction may also be used. The mechanism utilized is simple with no internal moving parts, and therefore high reliability can be expected, typically more reliability than a bump advance mechanism. The invention is particularly useful with the aerodynamic cross-sectional configurations of the cutting elements, as described in the parent applications, although the invention may also be utilized with conventional configurations of the cutting elements (e.g. circular), and is available for use in trimmers, edgers, rotary mowers, etc.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A vegetation cutting implement, comprising:
   a supporting shaft having an end;
   a rotatable cutter support head at the end of said supporting shaft;
   a power source capable of rotating said rotatable cutter support head and operatively connected thereto;
   a plurality of cutter elements releasably mounted to said rotatable cutter support head;
   each said cutter element comprising a self-supporting strut comprising more than 50% non-metallic material;
   each said cutter element having a cross-sectional configuration selected from the group consisting essentially of a tear drop, an ellipse with at least a 2:1 ratio, and a triangle;
   a central hub connected to said cutter elements; and
   webbing extending between said cutter elements.

2. A cutting implement as recited in claim 1 wherein each of said struts defines a first axis which is the strongest axis and has the highest moment of inertia, and a second, weaker, axis with a lower moment of inertia; and wherein said elements are mounted to said cutter support head so that during rotation of self-supporting struts about an axis of rotation the first axis of each strut is positively maintained and moves in a predefined cutting plane and so that the struts do not rotate about an axis perpendicular to the cutting plane.

3. A cutting implement as recited in claim 1 wherein said cutter elements are integral with the central hub.

4. A cutting implement as recited in claim 1 wherein said plurality of cutter elements comprises 3–8 elements.

5. A cutting implement as recited in claim 1 wherein each of said cutter elements comprises more than 90% rubber or plastic, so that each said cutter element will flex when it impacts a stationary solid object such as a tree or fence, without rotating about an axis perpendicular to the force of impact.

6. A replaceable hub with cutter elements for a vegetation cutter, said hub comprising:
   a generally annular central body portion having a central bore;
   a plurality of self-supporting strut cutter elements extending radially outwardly from said body portion and substantially evenly spaced circumferentially around said hub;
   each of said strut cutter elements comprising more than 90% rubber or plastic, so that each said cutter element will flex when it impacts a stationary solid object such as a tree or fence;
   wherein said elements are integral with said central body portion; and
   webbing extending between said cutter elements.

7. A vegetation cutting implement, comprising:
   a supporting shaft having an end;
   a rotatable cutter support head at the end of said supporting shaft;
   a power source capable of rotating said rotatable cutter support head and operatively connected thereto;
   a plurality of cutter elements releasably mounted to said rotatable cutter support head;
   each said cutter element comprising a self-supporting strut comprising more than 50% non-metallic material; and
   a central hub connected to said cutter elements, and a webbing extending between said cutter elements.

* * * * *

UNITED STATES PATENT AND TRADEMARK OFFICE
CERTIFICATE OF CORRECTION

PATENT NO. : 6,176,015 B1
DATED : January 23, 2001
INVENTOR(S) : Morabit et al

It is certified that error appears in the above-identified patent and that said Letters Patent is hereby corrected as shown below:

Column 1,
Line 66, delete "trip" and insert -- tip --.

Column 2,
Line 7, delete "trip" and insert -- tip --.

Signed and Sealed this

Ninth Day of October, 2001

Attest:

NICHOLAS P. GODICI
*Attesting Officer*  *Acting Director of the United States Patent and Trademark Office*